United States Patent Office 3,067,128
Patented Dec. 4, 1962

3,067,128
METAL OXIDE CONTAINING CATALYST BASE
Charles Newton Kimberlin, Jr., and Elroy Merle Gladrow, Baton Rouge, La., assignors to Esso Research and Engineering Company, a corporation of Delaware
No Drawing. Filed Aug. 29, 1958, Ser. No. 757,905
23 Claims. (Cl. 208—138)

The present invention relates to improvements in forming metal oxide adsorbents having high surface area, high porosity, low density and a multiplicity of pores of enlarged diameter which are useful as carriers or bases for catalytic components. More particularly, the present invention relates to improvements in hydroforming catalysts, desulfurization catalysts, etc., using a metal oxide support or base prepared according to the present invention. More specifically, the present invention relates to the preparation of alumina especially useful in the preparation of catalysts because of the large number of macropores or pores having a relatively large diameter.

While the alumina or other metal oxide gel is useful as a support for other catalysts as will be described hereinafter, a description of hydroforming will be given first. Hydroforming is an operation in which virgin naphtha or cracked naphtha or a mixture of the two is contacted at elevated temperatures and pressures, and in the presence of hydrogen with a solid catalytic material. For best results, the naphtha to be treated contains a substantial quantity of naphthenes. The main reaction in hydroforming is the dehydrogenation of the said naphthenes to the corresponding aromatics.

However, in addition to the dehydrogenation of the naphthenes other reactions occur during hydroforming and these include isomerization of normal paraffins to form isoparaffins, cyclization of paraffins followed by dehydrogenation to form aromatics, and hydrocracking of paraffins. The operation is usually a single pass process and the net result is to increase the octane rating of the feed stock.

The performance of the hydroforming process is largely dependent on the activity and selectivity of the hydroforming catalyst. In turn the performance of the catalyst is dependent principally on two factors as follows: (1) the material of the catalyst support and (2) the dispersion of the hydrogenation-dehydrogenation component on the support. There is evidence to the effect that the catalyst support influences catalyst selectivity, resistance to catalyst poisons, and resistance to irreversible aging, which latter is another way of saying that the catalyst life is extended in the case where a good support is part of the catalyst composition.

The dispersion of the active component controls the reactions of hydrocracking, isomerization, dehydrogenation and dehydrocyclization. Hence, it can be seen that to an important extent the dispersion of the active component on the carrier or base may be controlled by the nature of the latter. For example, if the carrier or base material has a dense, tight structure, with a large proportion of very small diameter micropores, the active component of the catalyst composition may not be able to penetrate the base structure during that step in the manufacture of the catalyst, wherein the active component dissolved in a solvent is contacted with the base to impregnate the base for the solution may not sufficiently penetrate the base with the result that the active component crystallizes in relatively large agglomerates on the outer surface of the base.

On the other hand, even when the base is immersed in a solution of the active component or agent of the hydroforming catalyst composition and the active agent actively enters deeply in the interior of the base structure, it may be sealed off in such a manner as to be inaccessible to the naphtha feed vapors when used in the hydroforming process to the extent that it is not available to promote catalytic conversions. As a result of the foregoing, it is both necessary and desirable that the catalyst base or carrier should be material possessing a high surface area and a high pore volume with a large proportion of the pores being of large pore diameter to permit ingress and escape of naphtha undergoing treatment during the hydroforming operation or other hydrocarbons in other catalytic operations.

The preparation of such a base having a high surface area and a high pore volume possessing large diameter with respect to the pores, would result in the material having a low particle density and a relatively low mechanical strength. Such a material would have weak utility in the fluidized catalyst operation since it would break down by attrition in a relatively short period of time to particle sizes much too small to be maintained in a well fluidized bed. However, in a non-regenerative operation a fixed bed of such catalyst could be utilized effectively.

The present invention relates to a method of preparing an alumina base which has a high surface area, a high pore volume, a low density, satisfactory mechanical strength, and a high proportion of large diameter pores such as macropores and superpores. The macropores are the pores having diameters greater than about 550 A. Low density highly porous catalyst are highly desirable for fixed bed operation but are not restricted to use in fixed catalyst bed processes.

The alumina base prepared according to the present process is prepared from an alumina hydrosol intermediate. Alumina hydrosols may be prepared in a variety of ways, such as (1) dialysis of an aluminum salt such as aluminum chloride, (2) treatment of an aluminum salt with an ion exchange resin, or (3) treatment of amalgamated aluminum metal with a dilute acid, such as dilute acetic acid. However, a preferred alumina hydrosol is prepared by the aluminum alcoholate procedure. The alcoholate procedure for preparing alumina is described in U.S. Patent No. 2,636,865. U.S. Patent No. 2,656,321 specifically described the preparation of alumina hydrosols by the aluminum alcoholate procedure but alumina sols prepared in other ways may be used.

Briefly, this procedure is as follows: Aluminum alcoholate is produced by dissolving aluminum metal in an alcohol or an alcohol-hydrocarbon mixture such as a 50/50 mixture of amyl alcohols and petroleum naphtha. An excess of alcohol or alcohol-hydrocarbon mixture serves as a solvent for the aluminum alcoholate product. A catalyst such as a small amount of a mercury salt such as mercuric chloride is usually employed to promote the reaction between the aluminum metal and the alcohol. The aluminum alcoholate is then hydrolyzed with water in the presence of a peptizing agent to produce an alumina hydrosol. Preferably, the peptizing agent, such as glacial acetic acid in the ratio of 1 part by weight of acid to 10 parts by weight of alumina to 2 parts by weight of acid to 1 part by weight of alumina, is added to the aluminum alcoholate solution prior to hydrolysis.

The amount of water used for hydrolysis may be such as to produce a hydrosol comprising about 1 to 6% by weight of alumina. The hydrolysis temperature may be in the range of about 60° to 220° F., preferably about 150° to 200° F. After the hydrolysis, the bulk of the alcohol may be recovered by decanting (if a water-insoluble alcohol such as amyl alcohol is used). The remaining alcohol may be removed from the alumina hydrosol by steaming. If desired, the hydrosol may be aged for a period of 1 to 10 hours at a temperature of about 150° to 200° F. prior to use. The alumina hydrosol prepared according to the foregoing method comprises alumina micelles in crystalline form and a large portion of it is eta-alumina. The alumina prepared according to the present process when impregnated with a platinum salt yields a catalyst which is extremely active and selective.

According to the present invention, the following steps are involved in the preparation of the alumina base from the alumina hydrosol:

(1) An alumina hydrosol is violently mixed with a relatively small proportion of an oil to form an oil-in-water emulsion or dispersion in which the water is in the continuous phase as distinguished from a water-in-oil emulsion obtained when using an excess of oil and in which the oil is in the continuous phase. The metal oxide hydrosol (alumina) to oil ratio is not critical but there must be an excess of water over oil and the ratio may be between about 5:1 and 20:1 by volume. A petroleum oil boiling above about 300° F., preferably about 450° to 950° F., may be used. However, other oils, such as vegetable or mineral oils are also suitable. About 0.1 to 0.5 weight percent (based on the alumina sol) of a non-metal-containing emulsifying agent may be used. If desired, the alumina sol may be heated to a temperature of 120° to 200° F. before being emulsified. This preheating is convenient, since it aids in the subsequent gelation of the emulsified sol upon addition of a gelling agent as described below.

(2) The emulsion or dispersion while being violently mixed or shortly afterwards before the onset of creaming is treated with a gelling or gelating agent, such as hexamethylene tetramine, urea, ammonia, ethylene oxide, etc. to cause gelation and to prevent creaming of the emulsion. The gelation agent may be added as a solution in water, as a dry powder, or as a gas in the case of ammonia or other gaseous gelling agents. The temperature of the emulsion and the nature of the gelating agent determine the rate of gelation of the emulsified sol. When using ammonia as gelling agent, temperatures in the range of 60° to 120° F. may be employed; when using hexamethylene tetraminine, higher temperatures in the range of 120° to 190° F. are desirable; when using urea, still higher temperatures in the range of 150° to 210° F. are preferred. Under these preferred conditions, the emulsified alumina hydrosol sets to alumina hydrogel or jelly within a period of 10 minutes or less, but longer times of setting may be used, if desired. The minute oil droplets comprising the emulsion are trapped in the hydrogel and retained for an indefinite time or until the composite is treated further.

(3) The gelled emulsion is oven dried at a temperature of about 200° to 300° F. to give an alumina having a moisture content of less than about 50% by weight. The dried chunks of alumina still comprising some trapped oil is broken up to give granules of about 2–50 mesh screen size and then treated with a light hydrocarbon oil to remove residual oil from the pores of the alumina hydrogel particles. The light hydrocarbon oil used for extraction is preferably a petroleum naphtha boiling in the range of about 150° to 400° F. While it is preferred to extract the residual oil from the dried gel as described, this is not essential since this residual oil may be burned from the gel particles by careful heating in air. The amount of naphtha used is minimized by recycling the naphtha in the extract after reboiling.

(4) The extracted alumina hydrogel particles are then carefully heated to a temperature between about 500° and 900° F. in air to remove all carbonaceous material.

(5) The dried alumina gel particles may then be impregnated with a solution in water of a water soluble platinum compound such as chloroplatinic acid, dried and calcined. However, any other method for incorporating platinum into the base or carrier may be employed. Or other impregnating solutions may be used for forming molybdenum oxide on alumina, cobalt molybdate on alumina, etc.

In order to set forth the invention more fully and to provide a disclosure of the preferred embodiments thereof, there are set forth below several specific examples giving full details as to the manner in which the new catalyst may be prepared.

*Example I*

One liter of 4.5% alumina sol prepared from aluminum alcoholate is mixed with 200 cc. Nujol, and 4 grams Armeen 2 HT (secondary $C_{16}$ and $C_{18}$ amines manufactured by Armour and Co.) emulsifying agent. Nujol is a medicinal grade petroleum oil boiling in the range of 620° to 930° F. An excess of alumina sol is used to form an oil-in-water emulsion. The sol and oil are blended and emulsified by vigorous mechanical agitation. The resulting oil-in-water emulsion (a 5:1 sol to oil ratio) while being mixed is then heated to about 190° F. and with agitation, 40 cc. of a solution comprising 12 grams hexamethylene tetramine added. In about one minute the emulsion set to a creamy white, firm but soft hydrogel. The emulsified oil in the hydrogel remained in the disperse phase. The hydrogel is dried at a temperature of about 250° F. for 16 hours. The dried alumina gel granules comprising some residual Nujol were then extracted with naphtha at room temperature to remove residual oil and the particles calcined overnight at about 700° F. The extraction was carried out using eight successive rinsings of the gel with naphtha. About 500 cc. of fresh naphtha were used in each rinse. The alumina gel particles were screened through a 12 mesh sieve and the 12+ mesh granules had a bulk density of 0.22 gr./cc.

*Example II*

One liter of about 5.0% alumina sol prepared from aluminum alcoholate is mixed with 3 grams of Armeen 2 HT emulsifying agent and heated to about 170° F. The hot sol is then charged to the blending vessel and mixed with 50 cc. Nujol. Emulsification to form an oil-in-water emulsion or dispersion is complete in about 2 minutes. Thirty cc. of a 40% hexamethylene tetramine solution are added to the hot emulsion (a 20:1 sol to oil ratio) with agitation to effect gelation. The hydrogel composite is dried at a temperature of 250° F. for 16 hours. The dried alumina gel particles were then extracted with naphtha to remove the residual Nujol, and the particles were calcined overnight at 700° F. The alumina gel particles were screened through a 12 mesh sieve and the 12+ mesh material had a bulk density of 0.33 gr./cc.

*Example III*

One liter of a 4.5% alumina sol prepared from aluminum alcoholate is heated at about 180° F. and blended with 3 grams Armeen 2 HT emulsifying agent and 100 cc. Nujol in an agitator vessel for 5 minutes. Emulsification to form an oil-in-water emulsion or dispersion is complete in about 1–2 minutes. This emulsion has a sol to oil ratio of 10:1. Thirty cc. of a 40% hexamethylene tetramine solution are added to the hot emulsion to effect gelation. The hydrogel composite was dried at a temperature of 250° F. for 16 hours. This process was repeated ten times and the oven dried alumina gel particles composited. The composite is then extracted with virgin petroleum naphtha boiling in the range of 200° to 350° F. to remove residual Nujol. The extraction was carried out in continuous manner by reboiling the extract to separate the naphtha and recycling to the extraction vessel. The alumina gel particles were then calcined overnight at about 700° F., followed by heating for about 2 hours at about 1000° F. The alumina gel particles had a density of about 0.18 gr./cc.

A portion of the calcined alumina (120 g.) is impregnated with 100 cc. of a platinum chloride solution containing 0.72 g. Pt. This volume of solution was insufficient to thoroughly wet the alumina, and it was necessary to add an additional 200 cc. of water. The catalyst is oven dried at 250° F.

A small portion of the catalyst powder is heated at 1000° F. for 4 hours. An examination of this material by nitrogen adsorption showed it to have a surface area of 284 square meters per gram, a pore volume of 0.78 cubic centimeter per gram, and an average pore diameter of 110 Angstrom units.

The remainder of the catalyst was converted into 3/16 inch by 3/16 inch cylindrical pellets and heated 4 hours at 1000° F. This catalyst comprises 0.6% Pt and is designated at catalyst A.

*Example IV*

Ten liters of aluminum alcoholate are hydrolyzed in 20 liters of water at room temperature using rapid and efficient mixing. The aqueous slurry is oven dried at 250° F.

A small portion of the alumina trihydrate so formed was heated 4 hours at 1000° F., after which it was examined and found to have a surface area of 191 square meters per gram, a pore volume of 0.36 cubic centimeter per gram, and an average pore diameter of 75 Angstrom units.

The remainder of the alumina trihydrate is calcined for 4 hours at 1100° F. The alumina is impregnated with platinum chloride solution (1 liter solution per kg. alumina) to give 0.6% Pt. The impregnated alumina was dried at a temperature of 250° F., converted into 3/16 inch by 3/16 inch cylindrical pellets, and activated by heating for 4 hours at 1000° F. This catalyst comprises 0.6% Pt and is designated as catalyst B.

*Example V*

A commercial catalyst containing 0.6% platinum supported on eta-alumina was formed into pellets 3/16 inch by 3/16 inch and activated by heating for 4 hours at 1000° F. A small portion of these pellets was examined for physical properties and had a surface area of 224 square meters per gram, a pore volume of 0.34 cc. per gram, and an average pore diameter of 61 Angstrom units.

The remainder of the catalyst was used in a fixed bed hydroforming operation and is designated as catalyst C.

*Example VI*

Catalysts "A," "B" and "C" prepared as described above were tested in a fixed bed hydroforming operation in the form of 3/16 inch by 3/16 inch cylindrical pellets. A virgin naphtha from mixed coastal crudes, having a boiling range of 200° to 350° F., a gravity of 55° API, and an octane number of 58, was employed as feed, with 5000 cubic feet of hydrogen added per barrel of feed. The hydroforming operation was conducted at 200 pounds per square inch pressure and a catalyst temperature of 900° F. The feed rate w./hr./w. (weight of naphtha per weight of catalyst per hour) was adjusted to give a product of 95 octane number.

In other words, except for the catalyst and feed rates, the catalysts were tested under the same conditions. In connection with feed rates, it is pointed out that catalyst "A" was used in a test where the feed rate was highest.

Correlated data are summarized below:

| Catalyst | At 95 Oct. No. (Clear) | |
|---|---|---|
| | W./hr./w. | Vol. percent $C_5+$ |
| A | 3.6 | 85 |
| B | 2.7 | 85 |
| C | 3.2 | 84 |

These data attest the high activity of catalyst A (based on emulsified alumina) in the hydroforming operation and show that the catalyst of the present invention with an average pore diameter of 110 Angstrom units (catalyst A) has substantially higher activity than catalysts whose bases have average port diameters of 75 Angstrom units (catalyst B) and 61 Angstrom units (catalyst C). It is believed that this higher activity is due to the presence of a larger percent of macropores (see Example XI, below) which allow for more efficient contact between feed molecules and active catalyst centers. The presence of macropores depends on the method of preparation of the catalyst base.

*Example VII*

A stream of 3.0% alumina sol prepared from aluminum alcoholate is heated to about 180° F. and blended in continuous operation with a stream of Nujol in a vigorously agitated mixing zone to effect emulsification. About 10 volumes of alumina sol per volume of oil were employed. To each two liter cut of hot emulsion, 100 cc. of a 40% hexamethylene tetramine solution were added to effect gelation. The composite gelled emulsion was dried at a temperature of about 250° F. The dried material was broken up into 2–20 mesh granules and extracted with a light virgin naphtha as in Example III to remove the residual Nujol. The alumina was then calcined for about 16 hours at about 850° F. and ground into a coarse powder.

Sixteen hundred and seventy (1670) grams of the calcined emulsified alumina are impregnated with 2 liters of a room temperature solution comprising 240.4 grams ammonium molybdate and 326.5 grams cobalt acetate. After oven drying at about 250° F. and calcining about 6 hours at 1200° F., this catalyst comprises 5% CoO—10% $MoO_3$—85% $Al_2O_3$ and is designated catalyst "D." It has a bulk density of 0.24 gr./cc. Nitrogen isotherm data show a surface area of 277 m.$^2$/gram with a most frequent pore diameter of 46 Angstroms. With the low density of 0.24 gr./cc. and the relatively normal most frequent pore diameter of 46 A., it is evident that considerable macropore volume, that is, volume which will not condense liquid nitrogen, is present in the catalyst.

*Example VIII*

Six liters of n-heptane were charged to a 12 liter round bottom flask and heated to boiling under reflux conditions. To this was added dropwise 3% alumina hydrosol, the hot heptane vaporizing the water from the sol and removing the water by breaking up the overhead water-heptane azeotrope. This is considered a water-in-oil emulsion that is continually broken up by removal of the water. That is, a water-in-oil emulsion is first formed and this emulsion is broken by the heat of the solvent with resultant drying of the alumina particles. The alumina particles were separated from the n-heptane by filtering and oven dried at about 250° F. The $Al_2O_3$ particles were then calcined 16 hours at 850° F.

Eleven-hundred and sixty-six (1166) grams of the calcined alumina base particles were impregnated with a room temperature solution (1800 cc.) comprising 167.5 grams ammonium molybdate and 228 grams cobalt acetate. After oven drying at about 250° F., the catalyst particles were heated for about 6 hours at about 1200° F. These catalyst particles comprise 5% CoO—10% $MoO_3$—85% $Al_2O_3$ and are designated catalyst "E."

Nitrogen isotherm measurements for catalyst "E" show a surface area of 236 m.$^2$/gram and a most frequent pore diameter of 35 Angstroms. The catalyst has a bulk density of about 0.70 gr./cc. These data show that the nitrogen adsorption data are not too different for this catalyst compared with catalyst "D," but because of the much higher bulk density (0.70 gr./cc.) compared to catalyst "D" (0.24 gr./cc.) the relative size of the macropores must be smaller with catalyst "E." This is the distinguishing feature of the emulsified alumina made according to the present invention, and is a result of being prepared from an oil-in-water emulsion (catalyst "D") versus the alumina from a water-in-oil emulsion (catalyst "E").

*Example IX*

This example is to designate catalyst "F" as being a commercially available desulfurizing cobalt molybdate on spray dried silica stabilized alumina catalyst containing about 3% by weight of cobalt oxide and about 9% molybdena in the form of ⅛" cylindrical pellets. Catalyst "F" is activated by heating for about 6 hours at about 1112° F.

*Example X*

Catalysts "D," "E," and "F" in the form of ⅛" cylindrical pellets were employed in the desulfurization of a West Texas gas oil having a gravity of 24.1° API, a sulfur content of 2.1 wt. percent, a 5% boiling point of 570° F., and a 69% point of 698° F. Operating conditions were 400 p.s.i.g. pressure, 3000 c.f. $H_2$/b. added, and 765° F. temperature. The following results show the superior activity of the catalyst made according to the present invention.

| Catalyst | D | E | F |
| --- | --- | --- | --- |
| Liq. Prod. Recovery, Vol. percent of Feed | 100.7 | 100.6 | 100.8 |
| Sulfur in Liq. Product, Wt. percent | 0.3 | 0.3 | 0.3 |
| Feed Rate, v./Hr./v.-(cc./Hr./cc. of catalyst) | 3.8 | 3.2 | 7.2 |
| Feed Rate, v./Hr./Gm.[1] | 5.6 | 2.8 | 2.2 |

[1] Cubic centimeters of oil feed per hour per gram of catalyst.

These data clearly show that catalysts based on the alumina made according to the present invention as an oil-in-water emulsion ("D") are more active, both on a volume and particularly on a weight basis than commercial catalysts and when based on an alumina prepared from a water-in-oil emulsion.

*Example XI*

Catalysts "D" and "E," and a sample of eta-alumina were examined for pore size distribution. The method employed the mercury penetration technique. A weighed sample of the catalyst is contacted with a known volume of mercury under varying pressures. Application of pressure allows for the actual penetration of the various size pores by the mercury, the amount of penetration being dependent on pressure and pore diameter. The following data show the difference in the pore size distribution between catalyst "D," which was prepared from an oil-in-water emulsion, catalyst "E," prepared from a water-in-oil emulsion, and eta-alumina.

| Catalyst | "D" | "E" | Eta $Al_2O_3$ |
| --- | --- | --- | --- |
| Superpore Volume, cc./gm. (pores>10,000 A.) | 0.321 | 0.194 | 0.010 |
| Macropore Volume, cc./gm. (pores 550 A.-10,000 A.) | 1.742 | 0.080 | 0.550 |
| Pore Volume, cc./gm. (pores 10 A.-550 A.) | 0.563 | 0.380 | 0.290 |
| Total Pore Volume, cc./gm. | 2.626 | 0.654 | 0.850 |

In summary, the present invention involves the formation of an oil in sol or water emulsion or dispersion which after gelling and drying yields an alumina or other gel having a large proportion of void volume comprising pores of diameters greater than about 200 A. and a low density. The method of making the catalyst base according to the present invention produces a catalyst base having a relatively large number of macropores. The relatively large macropore volume and superpore volume depends on the method of preparation and unexpected results are obtained by using the method of the present invention. Thus, by the method of our invention total pore volumes of about 2.0 to 2.7 cc./gr. or more and macropore volumes of about 1.25 to 1.75 cc./gr. or more are readily obtainable.

Catalysts prepared according to the present invention are useful in vapor phase operation, fixed bed operation such as hydroforming, and liquid phase operation such as desulfurization. The catalysts are also particularly advantageous for slurry operations. The catalysts may also be used as a powder or in finely divided condition in fluid solids beds.

The invention in its specific form involves emulsifying an alumina hydrosol with an oil to form an oil-in-water emulsion, then effecting gelation and thereafter extracting the included oil thus forming a base of high surface area, high porosity and possessing pores of enlarged diameter. When this base is impregnated with platinum, it forms an extremely active catalyst which at the same time possesses very high selectivity when utilized as a hydroforming catalyst. The alumina or other base can be used as a support for other catalytic materials.

It will be understood that the present invention is not limited to the preparation of alumina bases but is applicable to the preparation of any gel base or carrier, and furthermore, this base or carrier is not limited to use of a catalytic material such as platinum but may also be used to support platinum group metals or catalytic oxides or sulfides of the IV, V, VI and VIII groups of the periodic system. The materials present in these groups may also be supported by the foregoing improved carriers.

While the invention has been specifically described in connection with alumina hydrosol, it is to be understood that the invention is not restricted thereto and other metal oxide hydrosols such as silica hydrosol, or mixed oxide hydrosols such as silica-alumina, etc., may be made in oil-in-water emulsions to obtain catalysts or catalyst bases having a large percentage of macropores.

This application forms a continuation-in-part of Kimberlin et al. patent application Serial No. 424,761, filed April 21, 1954, now abandoned.

What is claimed is:

1. A method of forming an absorbent of high surface area, high porosity and a multiplicity of pores of enlarged diameter which comprises preparing a metal oxide hydrosol, emulsifying a larger volume of said hydrosol with a smaller volume of a hydrocarbon oil to form an oil-in-water emulsion, effecting gelation of said emulsion to form a hydrogel composite having oil droplets trapped therein and thereafter removing the water and oil droplets to yield a dry adsorbent of high surface area and high porosity which also contains a multiplicity of pores of enlarged diameter.

2. A method according to claim 1 in which the adsorbent material is alumina.

3. A method according to claim 1 in which the adsorbent material is alumina and further in which the dried alumina is impregnated with an active catalyst component.

4. A method according to claim 3 in which the active catalytic component is a platinum group metal.

5. A method according to claim 3 in which the active component is molybdenum oxide.

6. A method according to claim 3 in which the active component is cobalt molybdate.

7. A method according to claim 1 in which the hydrosol to oil ratio is between about 5:1 and 20:1.

8. A method according to claim 1 in which a gelation agent is added to said emulsion and the emulsion is heated to effect gelation of the hydrosol.

9. A method of forming a catalyst on a metal oxide carrier which comprises mixing a metal oxide hydrosol with a hydrocarbon oil to form an oil-in-water emulsion or dispersion, adding a gelation agent to effect gelation of said emulsion or dispersion to form a hydrogel composite having oil droplets trapped therein, drying the hydrogel composite, calcining the resulting dried gel and thereafter incorporating into the calcined gel a catalytic component.

10. A method according to claim 9 in which the metal oxide comprises alumina and the catalytic component contains molybedenum.

11. A method according to claim 9 in which the metal oxide comprises alumina and the catalytic component comprises cobalt molybdate.

12. A method according to claim 9 in which the metal oxide comprises alumina and the catalytic component comprises molybdenum oxide.

13. A method according to claim 9 in which the metal oxide comprises alumina and the catalytic component comprises a platinum group metal.

14. A method of forming a hydroforming catalyst comprising a platinum group metal carried on an alumina support, which catalyst is characterized in that the alumina has a high surface area, a high pore volume and a large proportion of the pores possessing a large diameter, which comprises mixing an alumina hydrosol with a hydrocarbon oil to form an oil-in-water emulsion or dispersion, admixing a gelation agent with the emulsion or dispersion to effect gelation of the alumina hydrosol emulsion or dispersion to form a hydrogel composite having oil droplets dispersed therein, drying the hydrogel composite, calcining the dried gel and thereafter incorporating into the calcined gel a platinum group metal.

15. A method according to claim 14 in which the gelation agent is hexamethylene tetramine.

16. A method according to claim 14 in which the alumina is predominantly eta-alumina.

17. An active catalyst comprising alumina which has a total pore volume of about 2.626 cubic centimeters per gram and a macropore volume (pores 550 to 10,000 Angstrom units) of about 1.742 cubic centimeters per gram.

18. An active catalyst comprising alumina which has a total port volume of at least about 2.0 cc./gram and a macropore volume (pores 550 to 10,000 Angstrom units) at least about 1.25 cc./gram.

19. A method according to claim 9 wherein a smaller volume of hydrocarbon oil than hydrosol is used.

20. A method according to claim 14 wherein a smaller volume of hydrocarbon oil than hydrosol is used.

21. A method according to claim 9 wherein the hydrosol to oil ratio is between about 5:1 and 20:1.

22. A method of hydroforming a naphtha which comprises contacting, at an elevated temperature and an elevated pressure in the presence of added hydrogen, the said naphtha with a catalyst comprising a platinum group metal carried on an alumina support, which catalyst is characterized in that the alumina has a high surface area, a high pore volume and a large proportion of pores possessing a large diameter, said catalyst being prepared by mixing an alumina hydrosol with an oil to form an oil-in-water emulsion or dispersion, admixing a gelation agent with said emulsion or dispersion to effect gelation of said alumina hydrosol emulsion or dispersion to form a hydrogel composite having oil droplets dispersed therein, drying said hydrogel composite, calcining said dried gel and thereafter incorporating into said calcined gel a platinum group metal.

23. A method of desulfurizing hydrocarbons which comprises contacting at an elevated temperature and an elevated pressure in the presence of added hydrogen, a relatively high boiling hydrocarbon oil with a catalyst comprising a desulfurizing catalytic component carried on an alumina support, which catalyst is characterized in that the alumina has a high surface area, a high pore volume and a large proportion of pores possessing a large diameter, said catalyst being prepared by mixing an alumina hydrosol with an oil to form an oil-in-water emulsion or dispersion, admixing a gelation agent with said emulsion or dispersion to effect gelation of said alumina hydrosol emulsion or dispersion to form a hydrogel composite having oil droplets dispersed therein, drying said hydrogel composite, calcining said dried gel and thereafter incorporating into said calcined gel a desulfurizing catalytic component.

References Cited in the file of this patent

UNITED STATES PATENTS

| | | |
|---|---|---|
| 2,568,352 | Milligan | Sept. 18, 1951 |
| 2,584,286 | Pierce et al. | Feb. 5, 1952 |
| 2,636,865 | Kimberlin et al. | Apr. 28, 1953 |
| 2,680,099 | Hoekstra | June 1, 1954 |
| 2,734,022 | Kimberlin et al. | Feb. 7, 1956 |